UNITED STATES PATENT OFFICE 2,589,943

4-ARYL-4-ACYL-OXY-PIPERIDINES

Kai Arne Jensen, Copenhagen, Denmark, assignor to Aktieselskabet "Ferrosan," Copenhagen, Denmark, a firm No Drawing. Application February 27, 1948, Serial No. 11,841. In Denmark October 1, 1941

Section 1, Public Law 690, August 8, 1946
Patent expires October 1, 1961

13 Claims. (Cl. 260—294.3)

The present invention relates to the production of some hitherto unknown compounds, namely 4-aryl-4-acyloxy-piperidines having the general formula:

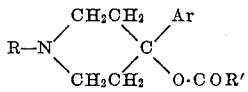

in which R denotes alkyl having a straight or divided carbon chain and R' denotes alkyl, aryl, aralkyl, cycloalkyl or heterocyclic radicals. Ar denotes an aryl radical. The invention relates also to the production of the hydrohalides of said compounds and to the production of an intermediate product occurring in the production of the said products. It has been found that compounds of this kind possess spasmolytical effects as well as an analgetic effect issuing from the central nervous system. Consequently they are useful for medical purposes or as far as the intermediate product mentioned above concerns as a means for producing the said compounds.

The invention is based upon the fact that 4-piperidones substituted in the 1-position by an alkyl radical having a straight or divided carbon chain will be converted by influence of an aromatic Grignard-compound in accordance with the following general scheme of reaction:

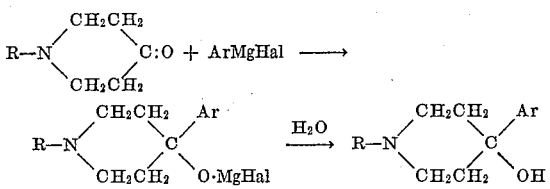

It appears from this general scheme of reaction that the 4-piperidone used for starting material is converted to a 4-aryl-hydroxypiperidine. Substances of this general composition have a slight spasmolytic effect and may be used for medical purposes either in the form of the free base or in the form of their hydrohalides. They are, however, particularly useful for the purpose of producing their esters or the hydrohalides thereof. This conversion is carried out by reacting the above named 4-aryl-hydroxypiperidines by means of carboxylic acid halides of the general formula R'COHal. The esters formed correspond to the general formula:

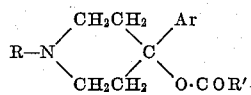

In the reaction the hydro-halides of the esters will be formed but they may easily be converted to the free esters or to other salts by methods known per se.

With these general statements of the objects and purposes of my invention I will now proceed to describe the embodiment thereof and the manner in which my invention is carried out and it will be understood that while I have described what may be considered as a preferable embodiment of my invention I do not limit myself to the precise conditions or proportions herein set forth as they may be varied by those skilled in the art in accordance with the particular purposes for which they are intended and the conditions under which they are to be utilized.

57 gms. 1-methyl-4-piperidone (McElvain: Journ. Am. Chem. Soc. 46 (1924) p. 1721) are added dropwise to an ether solution of phenyl magnesium bromide obtained from 100 gms. phenyl bromide. An intense reaction takes place whereby a solid substance separates. The reaction mixture is boiled for half an hour on a steam bath after which ice and diluted hydrochloric acid is added and the ether layer is removed. The aqueous layer is made strongly alkaline and extracted with ether, the ether extract is dried by means of solid potassium carbonate and distilled in vacuo. At 173° C. and 14 millimeter mercury 1-methyl - 4 - phenyl-4-hydroxy-piperidine distils, and crystallizes out by cooling. After recrystallization from acetone the melting point is 114–115° C.

If in place of using 57 gms. 1-methyl-4-piperidone as starting material 64 gms. of ethyl-4-piperidone are used the resulting product will be 1-methyl - 4 - phenyl - 4 - hydroxy-piperidone which when crystallized from acetone will melt at 85–86° C. In an analogous manner also 1-propyl-4-phenyl-4-hydroxy-piperidine can be produced by using 71 gms. 1-propyl-4-piperidone as starting material.

In order to carry out the esterification of the hydroxy-piperidine substituted by alkyl in the 1-position and by an aromatic radical particularly phenyl in the 4-position the following method described in connection with 1-methyl-4-phenyl-4-hydroxy-piperidine is typical.

5 gms. 1-methyl-4-phenyl-4-hydroxy-piperidines are dissolved in 250 cc. anhydrous ether. To this solution are added 10 gms. acetyl chloride dissolved in 100 cc. anhydrous ether whereby a white crystalline precipitate of 1-methyl-4-phenyl-4-acetoxypiperidine hydrochloride instantly separates out as a white crystalline precipitate which is filtered off on a suction filter and dried in an exsiccator.

After having been recrystallized from acetone or ethyl acetate the hydrochloride has melting point 231° C. The compound appears as a white crystalline powder which is easily soluble in water and alcohol.

Other hydro-halides of the general formula:

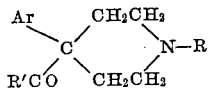

in which Ar is phenyl and R is methyl can be produced by using exactly the same method. If desired, however, acetone may be used for dissolving purpose in case of ether. By using propionic acid chloride in place of acetyl chloride the product may be 1-methyl-4-phenyl-4-propionoxy-piperidine hydrochloride, which may be recrystallized from acetone or isopropanol. The melting point of this product is 183–184° C. By using butyryl chloride in place of acetyl chloride the product is 1-methyl-4-phenyl-4-butyroxy-piperidine hydrochloride, which is very soluble in alcohol. It can be recrystallized although only at great loss from amyl alcohol. The melting point is 195–196° C. By using valerylchloride in place of acetyl chloride the product will be 1-methyl-4-phenyl-4-valeroxy-piperidine hydrochloride, which is very hygroscopic. It is exceedingly soluble in all alcohols and it has not been possible to find any solvent in which recrystalization can be carried out. The melting point is 205–206° C. By using isovaleryl chloride in place of acetyl chloride the product is 1 - methyl - 4 - phenyl-4-isovaleroxy-piperidine hydrochloride having much the same properties as the latter compound. The melting point is 203–204° C. By using caproic acid chloride in place of acetyl chloride the product is 1-methyl-4-phenyl-4-capronoxy-piperidine hydrochloride. The properties are nearly the same as those of the isovaleryl ester. The melting point is 198–199° C. By using benzoyl chloride in place of acetyl chloride the ester will be 1-methyl - 4 - phenyl-4-benzoxy-piperidine hydrochloride. This compound has similar solubility as the acetate. It may be recrystallized from ethanol. Melting point 219–220° C. In the same manner esters of the hydroxy-piperidines which in the 1-position are substituted f. inst. by ethyl or propyl and which in the 4-position are substituted f. inst. by phenyl can be produced. As example of such compounds the melting point of which has been ascertained I mention 1-ethyl-4-phenyl - 4 - butyroxy-piperidine hydrochloride the melting point of which is 206° C. and 1-propyl - 4 - phenyl-4-propionoxy - piperidine hydrochloride the melting point of which is 216° C. produced from the above mentioned ethyl and propyl substituted 4-phenyl-4-hydroxy-piperidines. As an example of an ester of the above named general formula, in which R' is heterocyclic may be mentioned the nicotinic acid ester.

It appears as if among the esters of the monovalent aliphatic acids the propionic ester has the greatest analgetic effect.

I claim:

1. Preparation of 4-aryl-4-acyloxy-piperidine hydrohalides of the general formula:

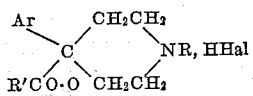

in which Ar is a monocyclic-aryl radical, R is an alkyl radical, Hal denotes halogen and R' is a radical selected from the group consisting of alkyl, phenyl and pyridyl radicals by reacting under anhydrous condition -4-monocyclic-aryl-hydroxy-piperidines of the general formula:

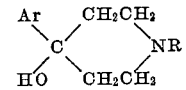

with a carboxylic acid acyl halide selected from the group consisting of fatty acid, benzoic acid and nicotinic acid halides.

2. 4-aryl-4-acyloxy-piperidine-hydrohalides of the general formula:

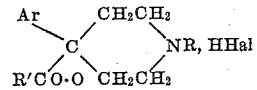

in which Ar is a monocyclic-aryl radical, R is an alkyl radical, Hal denotes halogen and R' is a radical selected from the group consisting of alkyl, phenyl and pyridyl radicals.

3. Preparation of 1-methyl-4-aryl-4-acyloxy-piperidine hydrohalides by reacting under anhydrous condition 1-methyl-4-monocyclic-aryl-oxypiperidine with carboxylic acid acyl halides selected from the group consisting of fatty acid, benzoic acid and nicotinic acid halides.

4. Preparation of 4-aryl-4-acyloxy-piperidine hydrohalides of the general formula:

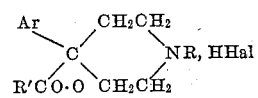

in which Ar is a monocyclic-aryl radical, R is an alkyl radical, Hal denotes halogen and R' is a radical selected from the group consisting of alkyl, phenyl and pyridyl radicals, by reacting under anhydrous condition 4-piperidones with monocyclic-aryl magnesium halides hydrolyzing the reaction product, recovering the hydroxy piperidine formed, and subjecting the 4-aryl-hydroxy-piperidines resulting from this reaction after removal thereof from the reaction mixture to the action of carboxylic acid acyl halides selected from the group consisting of fatty acid, benzoic acid and nicotinic acid halides.

5. 4 - phenyl - 4 - acyloxy - piperidine - hydrohalides of the general formula:

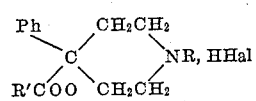

in which Ph is phenyl, R is an alkyl radical, Hal denotes halogen and R' is a hydrocarbon radical of not more than six carbon atoms.

6. Method of producing 4-phenyl-4-acyloxy-piperidine-hydrohalides of the general formula:

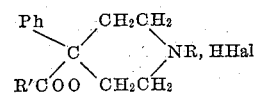

in which Ph is phenyl, R is an alkyl radical, Hal denotes halogen and R' is a hydrocarbon radical of not more than six carbon atoms, by reacting under anhydrous conditions 4-piperidones with phenyl-magnesium-halide, hydrolyzing the reaction product, separating the hydroxy piperidine, and subjecting the 4-phenyl-hydroxy piperidine resulting from this reaction in an anhydrous solvent to the action of a carboxylic acid acyl halide selected from the group consisting of fatty acid, benzoic acid and nicotinic acid halides to form 4-phenyl-4-acyloxy-piperidine-hydrohalide and recovering the last named product from the reaction mixture.

7. Method as in claim 6 in which R' is alkyl.
8. Method as in claim 6 in which R' is phenyl.
9. The product as set forth in claim 5 in which the hydrohalide is 1-methyl-4-phenyl-4-propionoxy-piperidine hydrochloride.
10. The product as set forth in claim 5 in which the hydrohalide is 1-methyl-4-phenyl-4-acetoxy-piperidine hydrochloride.
11. The product as set forth in claim 5 in which the hydrohalide is 1-methyl-4-phenyl-4-benzoxy-piperidine hydrochloride.
12. The product as set forth in claim 5 in which the hydrohalide is 1-ethyl-4-phenyl-4-butyroxy-piperidine hydrochloride.
13. The product as set forth in claim 5 in which the hydrohalide is 1-propyl-4-phenyl-4-propionoxy-piperidine hydrochloride.

KAI ARNE JENSEN.

REFERENCES CITED

The following references are of record in the file of this patent:

UNITED STATES PATENTS

| Number | Name | Date |
| --- | --- | --- |
| 1,714,180 | McElvain | May 21, 1929 |
| 2,248,018 | Eisleb | July 1, 1941 |
| 2,387,879 | Burtner | Oct. 30, 1945 |
| 2,411,664 | Miescher et al. | Nov. 26, 1946 |

FOREIGN PATENTS

| Number | Country | Date |
| --- | --- | --- |
| 232,206 | Great Britain | Feb. 18, 1926 |
| 60,592 | Denmark | Feb. 1, 1943 |